United States Patent
Lan

(10) Patent No.: US 11,059,204 B2
(45) Date of Patent: Jul. 13, 2021

(54) METHOD FOR MANUFACTURING FLEXIBLE MATERIAL HAVING SURFACE PROTECTING LAYER

(71) Applicant: Shenzhen China Star Optoelectronics Semiconductor Display Technology Co., Ltd., Shenzhen (CN)

(72) Inventor: Song Lan, Shenzhen (CN)

(73) Assignee: Shenzhen China Star Optoelectronics Semiconductor Display Technology Co., Ltd., Shenzhen (CN)

(*) Notice: Subject to any disclaimer, the term of this patent is extended or adjusted under 35 U.S.C. 154(b) by 563 days.

(21) Appl. No.: 15/775,005

(22) PCT Filed: Mar. 16, 2018

(86) PCT No.: PCT/CN2018/079213
§ 371 (c)(1),
(2) Date: May 10, 2018

(87) PCT Pub. No.: WO2019/165652
PCT Pub. Date: Sep. 6, 2019

(65) Prior Publication Data
US 2019/0263028 A1 Aug. 29, 2019

(30) Foreign Application Priority Data
Feb. 27, 2018 (CN) .......................... 201810161037.0

(51) Int. Cl.
B29C 41/12 (2006.01)
B29C 41/00 (2006.01)
(Continued)

(52) U.S. Cl.
CPC ........ *B29C 41/003* (2013.01); *B29C 35/0805* (2013.01); *B29C 41/12* (2013.01);
(Continued)

(58) Field of Classification Search
CPC ....... B29C 41/003; B29C 41/12; B29C 41/42; B29C 35/0805; B29C 2035/0827;
(Continued)

(56) References Cited

U.S. PATENT DOCUMENTS

2012/0292086 A1  11/2012  Auman et al.

FOREIGN PATENT DOCUMENTS

| CN | 102712754 | 10/2012 |
| CN | 106009015 | 10/2016 |
| CN | 107698785 | 2/2018 |

OTHER PUBLICATIONS

English abstract of CN107698785A (Year: 2018).*
(Continued)

*Primary Examiner* — Jeffrey M Wollschlager
*Assistant Examiner* — Xue H Liu

(57) ABSTRACT

According to the present disclosure, a plurality of aluminum oxide nanoparticles and a polymerizable monomer are dissolved in a polyimide solution to obtain a polyimide mixed solution. Next, the polyimide mixed solution is coated onto a glass substrate. Then, the surface of the glass substrate is irradiated with UV light to form a network polymer on the surface of the glass substrate, the network polymer enclosing the aluminum oxide nanoparticles. Finally, the glass substrate is heated to form the flexible material having the surface protecting layer. Abrasion resistance of the flexible material manufactured according to the present disclosure is excellent.

16 Claims, 3 Drawing Sheets

(51) Int. Cl.
  *B29C 35/08* (2006.01)
  *B29C 41/42* (2006.01)
  *C08J 5/18* (2006.01)
  *C08L 79/08* (2006.01)
  *C08L 33/26* (2006.01)
  *C08G 73/10* (2006.01)
  *B29K 79/00* (2006.01)
  *B29K 105/16* (2006.01)
  *B29K 509/02* (2006.01)
  *B29K 105/00* (2006.01)

(52) U.S. Cl.
  CPC .......... *B29C 41/42* (2013.01); *C08G 73/1017* (2013.01); *C08G 73/1067* (2013.01); *C08G 73/1071* (2013.01); *C08J 5/18* (2013.01); *C08L 33/26* (2013.01); *C08L 79/08* (2013.01); *B29C 2035/0827* (2013.01); *B29K 2079/08* (2013.01); *B29K 2105/0002* (2013.01); *B29K 2105/162* (2013.01); *B29K 2509/02* (2013.01); *C08J 2333/26* (2013.01); *C08J 2379/08* (2013.01); *C08J 2433/26* (2013.01); *C08J 2479/08* (2013.01); *C08L 2203/16* (2013.01)

(58) Field of Classification Search
  CPC .................. C08J 5/18; B29K 2079/08; B29K 2105/00002; B29K 2105/162; B29K 2509/02
  USPC ........................................................ 264/447
  See application file for complete search history.

(56) References Cited

OTHER PUBLICATIONS

English abstract of CN106009015A (Year: 2016).*
International Search Report and the Written Opinion dated Nov. 22, 2018 From the International Searching Authority Re. Application No. PCT/CN2018/079213 and Its Translation of Search Report Into English. (11 Pages).

* cited by examiner

METHOD FOR MANUFACTURING
FLEXIBLE MATERIAL HAVING SURFACE
PROTECTING LAYER

RELATED APPLICATIONS

This application is a National Phase of PCT Patent Application No. PCT/CN2018/079213 having International filing date of Mar. 16, 2018, which claims the benefit of priority of Chinese Patent Application No. 201810161037.0 filed on Feb. 27, 2018. The contents of the above applications are all incorporated by reference as if fully set forth herein in their entirety.

FIELD AND BACKGROUND OF THE INVENTION

The present disclosure relates to the field of display technology, and more particularly to a method for manufacturing a flexible material having a surface protecting layer.

Flexible electronic elements and flexible display technology are subjects that manufacturers mainly focus their research on and are one of the directions that electronics is developing in the near decades. Flexible electronic products, which are light weight, flexible, foldable, and even windable, include flexible TFT-LCDs and flexible OLEDs, and have gradually become the high-tech products having the most promising future.

However, flexible substrates still have some problems, such as low surface hardness, poor abrasion resistance, poor chemical resistance, and unsatisfactory heat resisting properties.

SUMMARY OF THE INVENTION

The object of the present disclosure is to provide a method for manufacturing a flexible material having a surface protecting layer, which improves abrasion resistance of the flexible substrate.

In one aspect, the present disclosure provides a method for manufacturing a flexible material having a surface protecting layer, comprising:

dissolving and uniformly mixing a plurality of aluminum oxide nanoparticles and a polymerizable monomer into a polyimide solution to obtain a polyimide mixed solution, wherein the polymerizable monomer includes acrylamide-based acrylate and derivatives thereof;

coating the polyimide mixed solution onto a glass substrate, such that the aluminum oxide nanoparticles are uniformly distributed on a surface of the glass substrate;

irradiating the surface of the glass substrate with UV light to form a network polymer on the surface of the glass substrate, the network polymer enclosing the aluminum oxide nanoparticles; and heating the glass substrate to form the flexible material having the surface protecting layer, wherein heating the glass substrate to form the flexible material having the surface protecting layer includes:

heating the glass substrate at 100-120° C. for 5-10 minutes;
heating the glass substrate at 200-250° C. for 20-60 minutes; and
heating the glass substrate at 300-350° C. for 5-15 minutes.

In accordance with the method of the present disclosure for manufacturing the flexible material having the surface protecting layer, the polymerizable monomer has a general formula of Sa-Sp-Sb, Sa is

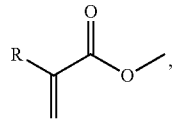

wherein R is H or $CH_3-(CH_2)_n-$, n is an integer of 1-8, and H can be replaced by F;

Sp is $-(CH_2)_n-$, wherein n is a value of 1-5, and $CH_2$ can be replaced by $-O-$, $-S-$, $-CO-$, $-CO-O-$, $-O-CO-$, $-O-CO-O-$, $-OCH_2-$, $-CH_2O-$, $-CH=CH-$, $-CF=CF-$, $-C\equiv C-$, $-CH=CH-COO-$, or $-OCO-CH=CH-$; and Sb is

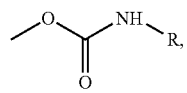

wherein R is H or $CH_3-(CH_2)_n-$, n is an integer of 1-8, and H can be replaced by F.

In accordance with the method of the present disclosure for manufacturing the flexible material having the surface protecting layer, the polymerizable monomer is

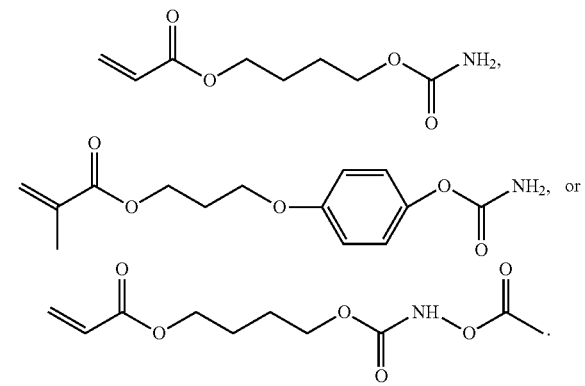

In accordance with the method of the present disclosure for manufacturing the flexible material having the surface protecting layer, an irradiation energy of the UV light is 85-100 mW/cm$^2$, and an irradiation duration of the UV light is 10-60 minutes.

In accordance with the method of the present disclosure for manufacturing the flexible material having the surface protecting layer, before dissolving and uniformly mixing the aluminum oxide nanoparticles and the polymerizable monomer into the polyimide solution to obtain the polyimide mixed solution, the method further comprises: dissolving one or more dianhydride monomers and one or more diamine monomers into an organic solvent selected from N-methyl-pyrrolidone, N-ethylpyrrolidine, γ-hexalactone, dimethyl sulfoxide, or dichloromethane to obtain a polyimide solution.

In accordance with the method of the present disclosure for manufacturing the flexible material having the surface protecting layer, after heating the glass substrate to form the flexible material having the surface protecting layer, the method further comprises: separating the glass substrate from the flexible material having the surface protecting layer.

In accordance with the method of the present disclosure for manufacturing the flexible material having the surface protecting layer, separating the glass substrate from the flexible material having the surface protecting layer is implemented by a laser or a mechanical separation method.

In another aspect, the present disclosure provides a method for manufacturing a flexible material having a surface protecting layer, comprising:

dissolving and uniformly mixing a plurality of aluminum oxide nanoparticles and a polymerizable monomer into a polyimide solution to obtain a polyimide mixed solution;

coating the polyimide mixed solution onto a glass substrate, such that the aluminum oxide nanoparticles are uniformly distributed on a surface of the glass substrate;

irradiating the surface of the glass substrate with UV light to form a network polymer on the surface of the glass substrate, the network polymer enclosing the aluminum oxide nanoparticles; and heating the glass substrate to form the flexible material having the surface protecting layer.

In accordance with the method of the present disclosure for manufacturing the flexible material having the surface protecting layer, the polymerizable monomer includes acrylamide-based acrylate and derivatives thereof.

In accordance with the method of the present disclosure for manufacturing the flexible material having the surface protecting layer, the polymerizable monomer has a general formula of Sa-Sp-Sb, Sa is

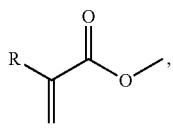

wherein R is H or $CH_3—(CH_2)_n—$, n is an integer of 1-8, and H can be replaced by F;

Sp is $—(CH_2)_n—$, wherein n is a value of 1-5, and $CH_2$ can be replaced by —O—, —S—, —CO—, —CO—O—, —O—CO—, —O—CO—O—, —OCH$_2$—, —CH$_2$O—, —CH═CH—, —CF═CF—, —C≡C—, —CH═CH—COO—, or —OCO—CH═CH—; and Sb is

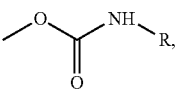

wherein R is H or $CH_3—(CH_2)_n—$, n is an integer of 1-8, and H can be replaced by F.

In accordance with the method of the present disclosure for manufacturing the flexible material having the surface protecting layer, the polymerizable monomer is

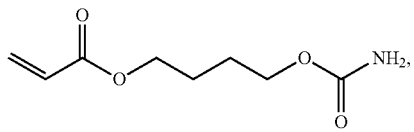

-continued

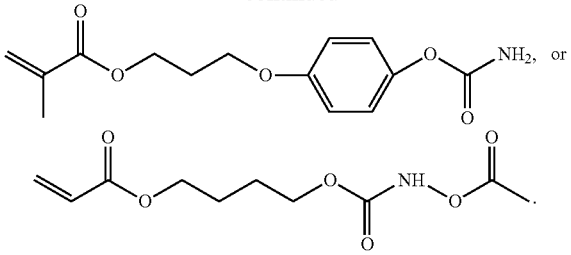

In accordance with the method of the present disclosure for manufacturing the flexible material having the surface protecting layer, an irradiation energy of the UV light is 85-100 mW/cm$^2$, and an irradiation duration of the UV light is 10-60 minutes.

In accordance with the method of the present disclosure for manufacturing the flexible material having the surface protecting layer, heating the glass substrate to obtain the polyimide mixed solution includes:

heating the glass substrate at 100-120° C. for 5-10 minutes;

heating the glass substrate at 200-250° C. for 20-60 minutes; and heating the glass substrate at 300-350° C. for 5-15 minutes.

In accordance with the method of the present disclosure for manufacturing the flexible material having the surface protecting layer, before dissolving and uniformly mixing the aluminum oxide nanoparticles and the polymerizable monomer into the polyimide solution to obtain the polyimide mixed solution, the method further comprises:

dissolving one or more dianhydride monomers and one or more diamine monomers into an organic solvent selected from N-methyl-pyrrolidone, N-ethylpyrrolidine, γ-hexalactone, dimethyl sulfoxide, or dichloromethane to obtain a polyimide solution.

In accordance with the method of the present disclosure for manufacturing the flexible material having the surface protecting layer, after heating the glass substrate to form the flexible material having the surface protecting layer, the method further comprises:

separating the glass substrate from the flexible material having the surface protecting layer.

In accordance with the method of the present disclosure for manufacturing the flexible material having the surface protecting layer, separating the glass substrate from the flexible material having the surface protecting layer is implemented by a laser or a mechanical separation method.

According to the present disclosure, a plurality of aluminum oxide nanoparticles and a polymerizable monomer are dissolved in a polyimide solution to obtain a polyimide mixed solution. Next, the polyimide mixed solution is coated onto a glass substrate. Then, the surface of the glass substrate is irradiated with UV light to form a network polymer on the surface of the glass substrate, the network polymer enclosing the aluminum oxide nanoparticles. Finally, the glass substrate is heated to form the flexible material having the surface protecting layer. The abrasion resistance of the flexible material manufactured according to the present disclosure is excellent.

BRIEF DESCRIPTION OF THE SEVERAL VIEWS OF THE DRAWINGS

To explain in detail the technical schemes of the embodiments or existing techniques, drawings that are used to illustrate the embodiments or existing techniques are provided. The illustrated embodiments are just a part of those of the present disclosure. It is easy for any person having ordinary skill in the art to obtain other drawings without labor for inventiveness.

DESCRIPTION OF SPECIFIC EMBODIMENTS OF THE INVENTION

Figure 1:
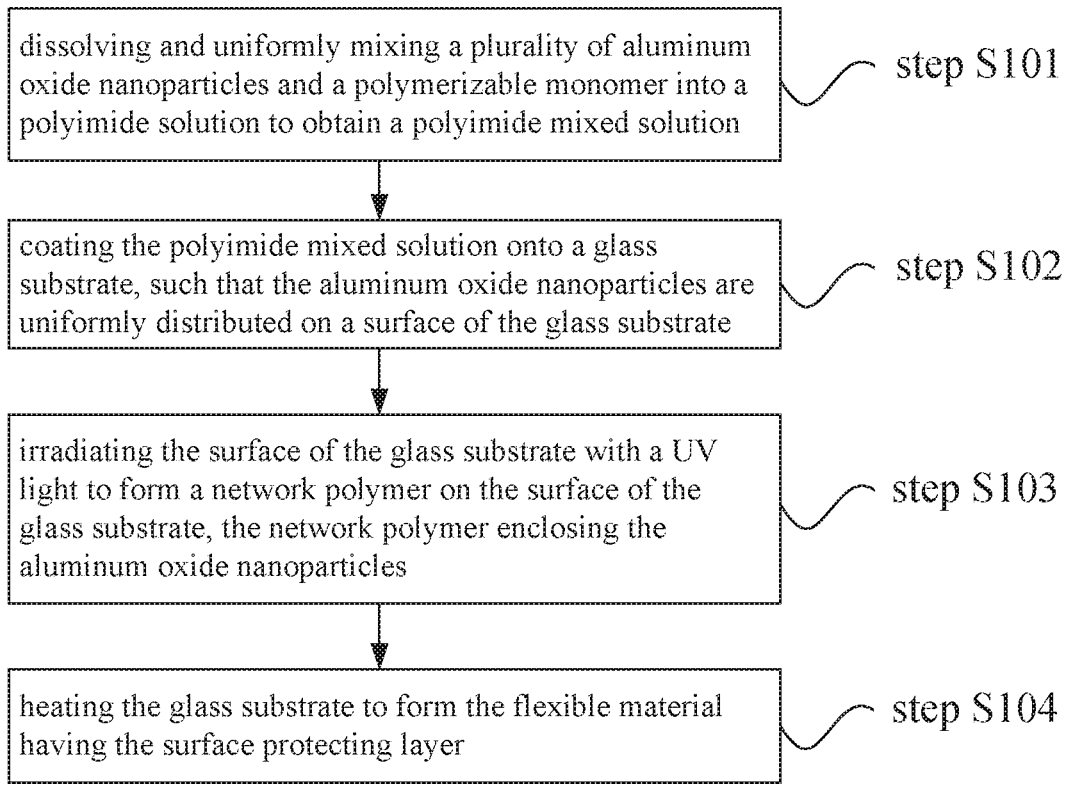
FIG. 1 shows a flowchart of a method for manufacturing a flexible material having a surface protecting layer according to one embodiment of the present disclosure.

The following embodiments refer to the accompanying drawings for exemplifying specific implementable embodiments of the present disclosure. Moreover, directional terms described by the present disclosure, such as upper, lower, front, back, left, right, inner, outer, side, etc., are only directions by referring to the accompanying drawings, and thus the used directional terms are used to describe and understand the present disclosure, but the present disclosure is not limited thereto. In the drawings, the same reference symbol represents the same or similar components.

Please refer to FIG. 1, which shows a flowchart of a method for manufacturing a flexible material having a surface protecting layer according to one embodiment of the present disclosure. This method includes:

a step S101 of dissolving and uniformly mixing a plurality of aluminum oxide nanoparticles and a polymerizable monomer into a polyimide solution to obtain a polyimide mixed solution;

a step S102 of coating the polyimide mixed solution onto a glass substrate, such that the aluminum oxide nanoparticles are uniformly distributed on a surface of the glass substrate;

a step S103 of irradiating the surface of the glass substrate with UV light to form a network polymer on the surface of the glass substrate, the network polymer enclosing the aluminum oxide nanoparticles; and a step S104 of heating the glass substrate to form the flexible material having the surface protecting layer.

The following detailed description is made with reference to the accompanying drawings to explain each step of the method for manufacturing a flexible material having a surface protecting layer.

In the step S101, the polymerizable monomer includes acrylamide-based acrylate and derivatives thereof. Specifically, the polymerizable monomer has a general formula of Sa-Sp-Sb, wherein Sa is

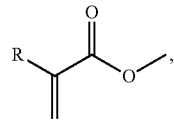

wherein R is H or $CH_3-(CH_2)_n-$, n is an integer of 1-8, and H can be replaced by F;

Sp is $-(CH_2)_n-$, wherein n is a value of 1-5, and $CH_2$ can be replaced by $-O-$, $-S-$, $-CO-$, $-CO-O-$, $-O-CO-$, $-O-CO-O-$, $-OCH_2-$, $-CH_2O-$, $-CH=CH-$, $-CF=CF-$, $-C\equiv C-$, $-CH=CH-COO-$, or $-OCO-CH=CH-$; and Sb is

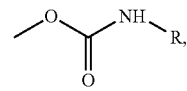

wherein R is H or $CH_3-(CH_2)_n-$, n is an integer of 1-8, and H can be replaced by F.

For example, the polymerizable monomer can be a

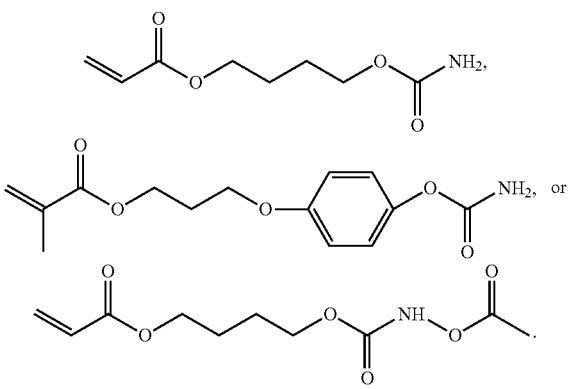

Figure 2:
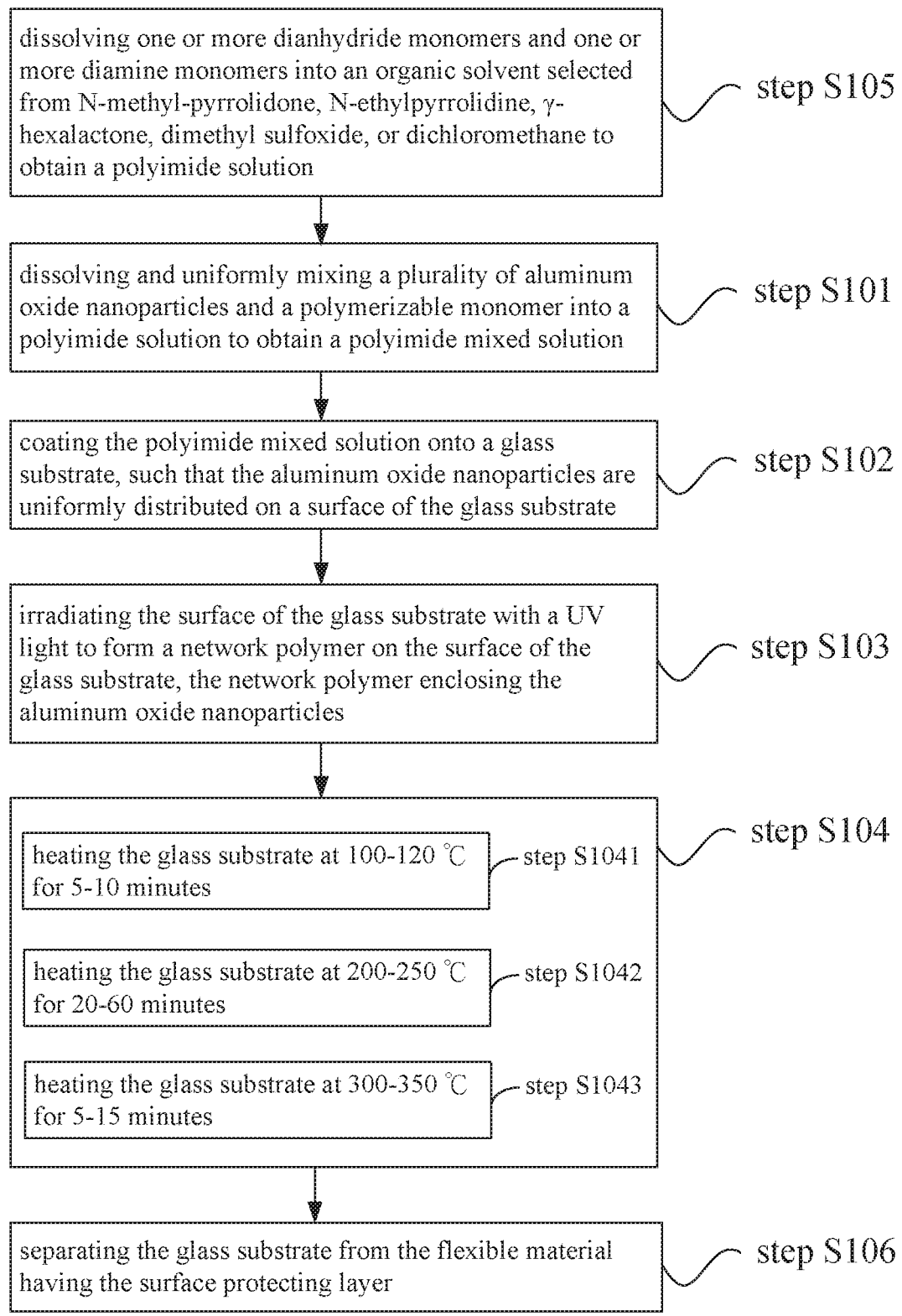
FIG. 2 shows a flowchart of a method for manufacturing a flexible material having a surface protecting layer according to another embodiment of the present disclosure.

Please refer to FIG. 2, which shows a flowchart of a method for manufacturing a flexible material having a surface protecting layer according to another embodiment of the present disclosure. Before the step S101, the method further includes a step S105 of dissolving one or more dianhydride monomers and one or more diamine monomers into an organic solvent selected from N-methyl-pyrrolidone, N-ethylpyrrolidine, γ-hexalactone, dimethyl sulfoxide, or dichloromethane to obtain a polyimide solution. The dianhydride monomers can be

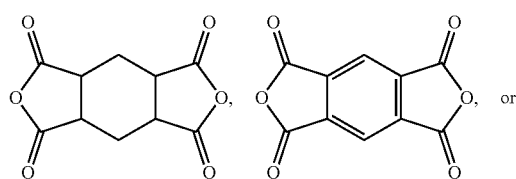

-continued

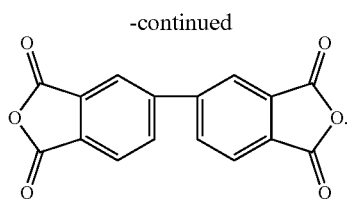

The diamine monomers can be

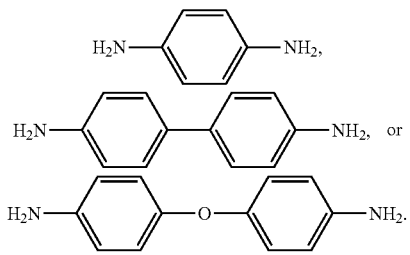

For instance, firstly, N-methyl-pyrrolidone, propylene glycol monomethyl ether acetate, and 2-butanone are uniformly mixed to prepare 1000 g of polyamic acid solvent, where N-methyl-pyrrolidone, propylene glycol monomethyl ether acetate, and 2-butanone have a mass ratio of 45%: 40%: 15%. Next, 75 g of dianhydride monomer and 75 g of diamine monomer are uniformly mixed to obtain a polyimide solution. Then, 5 g of aluminum oxide nanoparticles and 10 g of polymerizable monomer are dissolved in the polyimide solution to obtain a polyimide mixed solution. It is understood that quantities of the components could be adjusted, and are not limited to that shown in this preferred embodiment.

Figure 3:
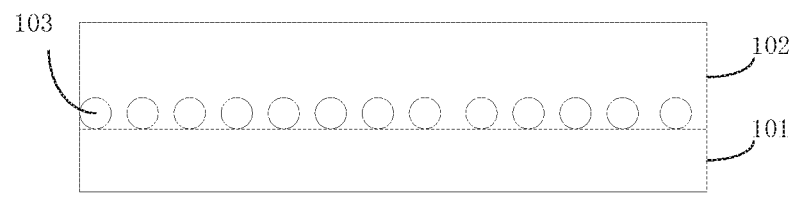
FIG. 3 is a cross-sectional view showing a step S102 in a method for manufacturing a flexible material having a surface protecting layer according to one embodiment of the present disclosure.

To explain the step S102, please refer to FIGS. 1 and 3. FIG. 3 is a cross-sectional view showing the step S102 in a method for manufacturing a flexible material having a surface protecting layer according to one embodiment of the present disclosure. In the step S102, the polyimide mixed solution obtained in the step S101 is coated onto the glass substrate 101, such that the aluminum oxide nanoparticles 103 are uniformly distributed on a surface of the glass substrate 101.

Figure 4:
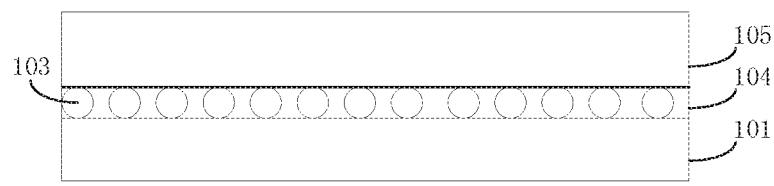
FIG. 4 is a cross-sectional view showing a step S103 in a method for manufacturing a flexible material having a surface protecting layer according to one embodiment of the present disclosure.

To explain the step S103, please refer to FIGS. 1 and 4. FIG. 4 is a cross-sectional view showing the step S103 in a method for manufacturing a flexible material having a surface protecting layer according to one embodiment of the present disclosure. In the step S103, the surface of the glass substrate 101, on which the polyimide mixed solution has been coated, is irradiated with UV light to form a network polymer on the surface of the glass substrate 101, the network polymer enclosing the aluminum oxide nanoparticles 103. Since UV irradiation is performed, a polymer/aluminum oxide layer 104 is formed on the surface of the glass substrate 101. Above the polymer/aluminum oxide layer 104 is a polyimide solution layer 105.

Preferably, an irradiation energy of the UV light is 85-100 mW/cm$^2$, and an irradiation duration of the UV light is 10-60 minutes.

Figure 5:
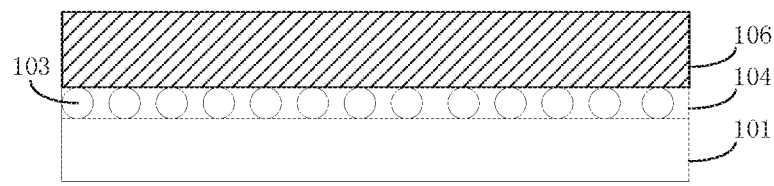
FIG. 5 is a cross-sectional view showing a step S104 in a method for manufacturing a flexible material having a surface protecting layer according to one embodiment of the present disclosure.

To explain the step S104, please refer to FIGS. 2 and 5. FIG. 5 is a cross-sectional view showing a step S104 in a method for manufacturing a flexible material having a surface protecting layer according to one embodiment of the present disclosure. The step S104 includes:

a step S1041 of heating the glass substrate at 100-120° C. for 5-10 minutes;
a step S1042 of heating the glass substrate at 200-250° C. for 20-60 minutes; and
a step S1043 of heating the glass substrate at 300-350° C. for 5-15 minutes.

The step S1041, in which the glass substrate is heated at 100-120° C. for 5-10 minutes, is performed in order to remove solvents in the polyimide mixed solution. The step S1042, in which the glass substrate is heated at 200-250° C. for 20-60 minutes, is performed in order to have dianhydride react with polyamic acid and amide of polymerizable monomer to cause dehydration condensation. The step S1043, in which the glass substrate is heated at 300-350° C. for 5-15 minutes, is performed in order to have reactions taking place complete. Thus, a polymer material is formed on the glass substrate. The polymer material includes the polymer/aluminum oxide layer 104 and the polyimide layer 106.

Please refer to FIG. 2. After the step S104 is performed, the method of the preset disclosure further includes a step S106 of separating the glass substrate from the flexible material having the surface protecting layer. Separating the glass substrate from the flexible material having the surface protecting layer could be implemented by a laser or a mechanical separation method.

According to the present disclosure, a plurality of aluminum oxide nanoparticles and a polymerizable monomer are dissolved and uniformly mixed into a polyimide solution to obtain a polyimide mixed solution. Next, the polyimide mixed solution is coated onto a glass substrate, such that the aluminum oxide nanoparticles are uniformly distributed on a surface of the glass substrate. Then, the surface of the glass substrate is irradiated with UV light to form a network polymer on the surface of the glass substrate, the network polymer enclosing the aluminum oxide nanoparticles. Finally, the glass substrate is heated to form the flexible material having the surface protecting layer. The abrasion resistance of the flexible material manufactured according to the present disclosure is excellent.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:
1. A method for manufacturing a flexible material having a surface protecting layer, comprising:
dissolving and uniformly mixing a plurality of aluminum oxide nanoparticles and a polymerizable monomer into a polyimide solution to obtain a polyimide mixed solution, wherein the polymerizable monomer includes acrylamide-based acrylate and derivatives thereof;
coating the polyimide mixed solution onto a glass substrate, such that the aluminum oxide nanoparticles are uniformly distributed on a surface of the glass substrate;
irradiating the surface of the glass substrate with UV light to form a network polymer on the surface of the glass substrate, the network polymer enclosing the aluminum oxide nanoparticles; and
heating the glass substrate to form the flexible material having the surface protecting layer, wherein heating the glass substrate to form the flexible material having the surface protecting layer includes:

heating the glass substrate at 100-120° C. for 5-10 minutes;

heating the glass substrate at 200-250° C. for 20-60 minutes; and heating the glass substrate at 300-350° C. for 5-15 minutes.

2. The method for manufacturing the flexible material having the surface protecting layer according to claim 1, wherein the polymerizable monomer has a general formula of Sa-Sp-Sb, Sa is

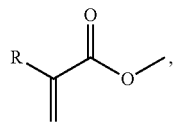

wherein R is H or $CH_3-(CH_2)_n-$, n is an integer of 1-8, and one or more H of $CH_3-(CH_2)_n-$ can be replaced by F;

Sp is $-(CH_2)_n-$, wherein n is an integer of 1-5, and when n=2, 3, 4, or 5, one $CH_2$ of $-(CH_2)_n-$ can be replaced by $-O-$, $-S-$, $-CO-$, $-CO-O-$, $-O-CO-$, $-O-CO-O-$, $-OCH_2-$, $-CH_2O-$, $-CH=CH-$, $-CF=CF-$, $-C\equiv C-$, $-CH=CH-COO-$, or $-OCO-CH=CH-$; and Sb is

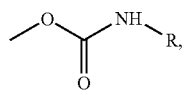

wherein R is H or $CH_3-(CH_2)_n-$, n is an integer of 1-8, and one or more H of $CH_3-(CH_2)_n-$ can be replaced by F.

3. The method for manufacturing the flexible material having the surface protecting layer according to claim 2, wherein the polymerizable monomer is

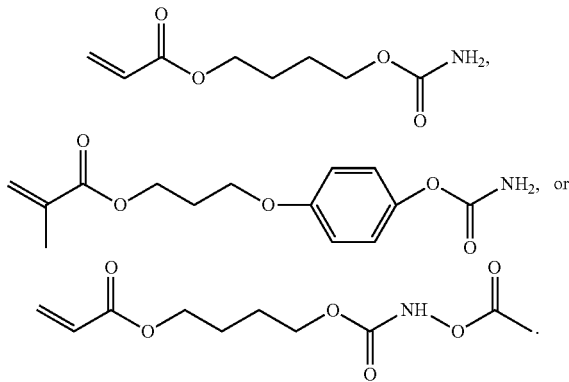

4. The method for manufacturing the flexible material having the surface protecting layer according to claim 1, wherein an irradiation energy of the UV light is 85-100 mW/cm$^2$, and an irradiation duration of the UV light is 10-60 minutes.

5. The method for manufacturing the flexible material having the surface protecting layer according to claim 1, wherein before dissolving and uniformly mixing the aluminum oxide nanoparticles and the polymerizable monomer into the polyimide solution to obtain the polyimide mixed solution, the method further comprises:

dissolving one or more dianhydride monomers and one or more diamine monomers into an organic solvent selected from N-methyl-pyrrolidone, N-ethylpyrrolidine, γ-hexalactone, dimethyl sulfoxide, or dichloromethane to obtain a polyimide solution.

6. The method for manufacturing the flexible material having the surface protecting layer according to claim 1, wherein after heating the glass substrate to form the flexible material having the surface protecting layer, the method further comprises:

separating the glass substrate from the flexible material having the surface protecting layer.

7. The method for manufacturing the flexible material having the surface protecting layer according to claim 6, wherein separating the glass substrate from the flexible material having the surface protecting layer is implemented by a laser or a mechanical separation method.

8. A method for manufacturing a flexible material having a surface protecting layer, comprising:

dissolving and uniformly mixing a plurality of aluminum oxide nanoparticles and a polymerizable monomer into a polyimide solution to obtain a polyimide mixed solution;

coating the polyimide mixed solution onto a glass substrate, such that the aluminum oxide nanoparticles are uniformly distributed on a surface of the glass substrate;

irradiating the surface of the glass substrate with UV light to form a network polymer on the surface of the glass substrate, the network polymer enclosing the aluminum oxide nanoparticles; and heating the glass substrate to form the flexible material having the surface protecting layer.

9. The method for manufacturing the flexible material having the surface protecting layer according to claim 8, wherein the polymerizable monomer includes acrylamide-based acrylate and derivatives thereof.

10. The method for manufacturing the flexible material having the surface protecting layer according to claim 9, wherein the polymerizable monomer has a general formula of Sa-Sp-Sb, Sa is

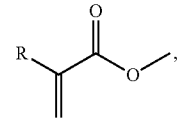

wherein R is H or $CH_3-(CH_2)_n-$, n is an integer of 1-8, and one or more H of $CH_3-(CH_2)_n-$ can be replaced by F;

Sp is $-(CH_2)_n-$, wherein n is an integer of 1-5, and when n=2, 3, 4, or 5, one $CH_2$ of $-(CH_2)_n-$ can be replaced by $-O-$, $-S-$, $-CO-$, $-CO-O-$, $-O-CO-$, $-O-CO-O-$, $-OCH_2-$, $-CH_2O-$, $-CH=CH-$, $-CF=CF-$, $-C\equiv C-$, $-CH=CH-COO-$, or $-OCO-CH=CH-$; and Sb is

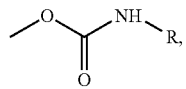

wherein R is H or $CH_3-(CH_2)_n-$, n is an integer of 1-8, and one or more H of $CH_3-(CH_2)_n-$ can be replaced by F.

11. The method for manufacturing the flexible material having the surface protecting layer according to claim 10, wherein the polymerizable monomer is

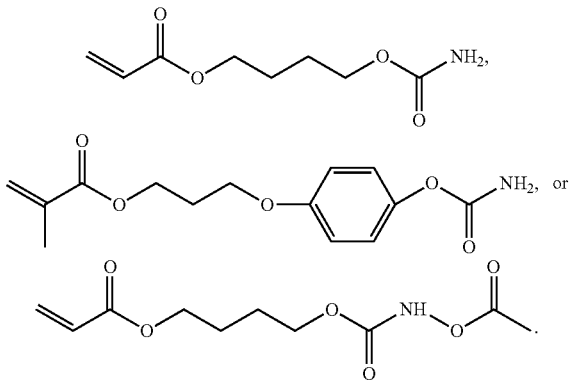

12. The method for manufacturing the flexible material having the surface protecting layer according to claim 8, wherein an irradiation energy of the UV light is 85-100 mW/cm$^2$, and an irradiation duration of the UV light is 10-60 minutes.

13. The method for manufacturing the flexible material having the surface protecting layer according to claim 8, wherein heating the glass substrate to obtain the polyimide mixed solution includes:

heating the glass substrate at 100-120° C. for 5-10 minutes;

heating the glass substrate at 200-250° C. for 20-60 minutes; and heating the glass substrate at 300-350° C. for 5-15 minutes.

14. The method for manufacturing the flexible material having the surface protecting layer according to claim 8, wherein before dissolving and uniformly mixing the aluminum oxide nanoparticles and the polymerizable monomer into the polyimide solution to obtain the polyimide mixed solution, the method further comprises:

dissolving one or more dianhydride monomers and one or more diamine monomers into an organic solvent selected from N-methyl-pyrrolidone, N-ethylpyrrolidine, y-hexalactone, dimethyl sulfoxide, or dichloromethane to obtain a polyimide solution.

15. The method for manufacturing the flexible material having the surface protecting layer according to claim 8, wherein after heating the glass substrate to form the flexible material having the surface protecting layer, the method further comprises:

separating the glass substrate from the flexible material having the surface protecting layer.

16. The method for manufacturing the flexible material having the surface protecting layer according to claim 15, wherein separating the glass substrate from the flexible material having the surface protecting layer is implemented by a laser or a mechanical separation method.

* * * * *